May 30, 1933.  W. H. SACHS ET AL  1,911,533
APPARATUS FOR DRYING CLAY AND OTHER CERAMIC MATERIALS
Filed March 13, 1931   5 Sheets-Sheet 1

INVENTOR
WILLIAM H. SACHS.
RUSSELL T. VORIS.
BY
Toulmin & Toulmin
ATTORNEY

May 30, 1933.  W. H. SACHS ET AL  1,911,533
APPARATUS FOR DRYING CLAY AND OTHER CERAMIC MATERIALS
Filed March 13, 1931   5 Sheets-Sheet 2
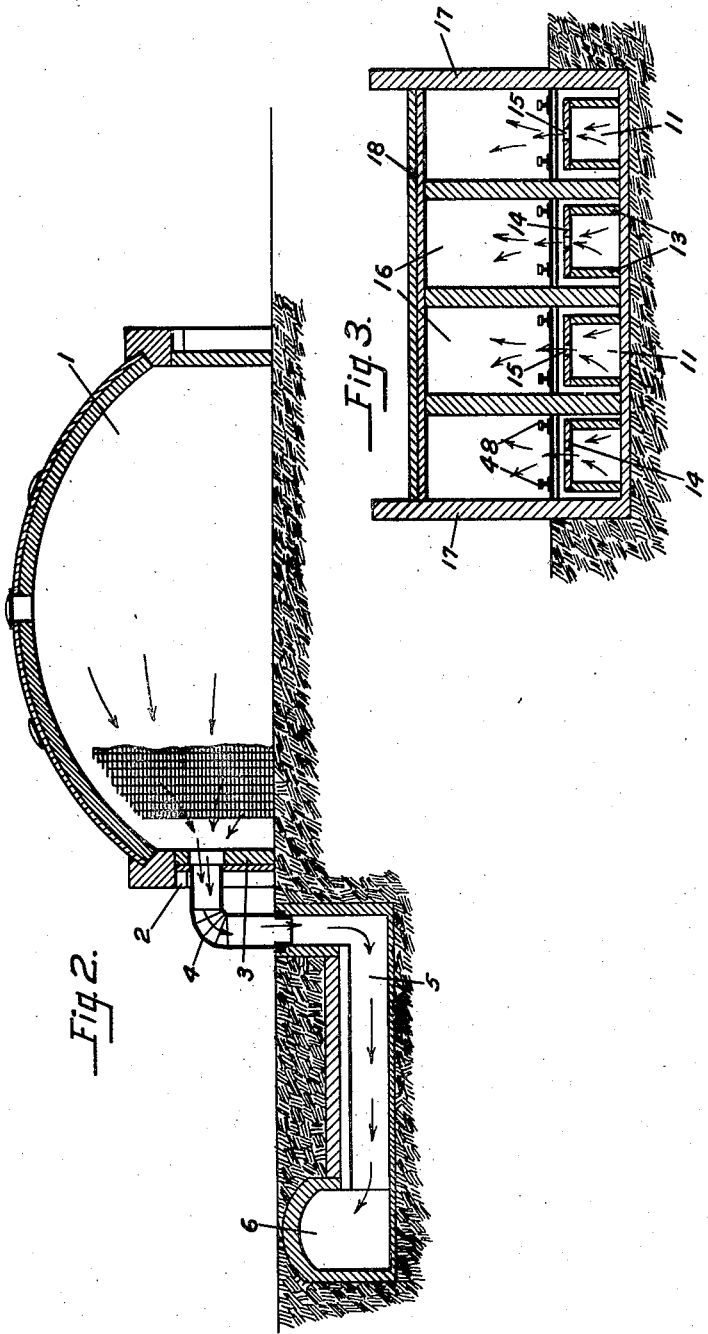
INVENTOR
WILLIAM H. SACHS.
RUSSELL T. VORIS.
BY
Toulmin & Toulmin
ATTORNEY May 30, 1933.   W. H. SACHS ET AL   1,911,533
APPARATUS FOR DRYING CLAY AND OTHER CERAMIC MATERIALS
Filed March 13, 1931   5 Sheets-Sheet 3
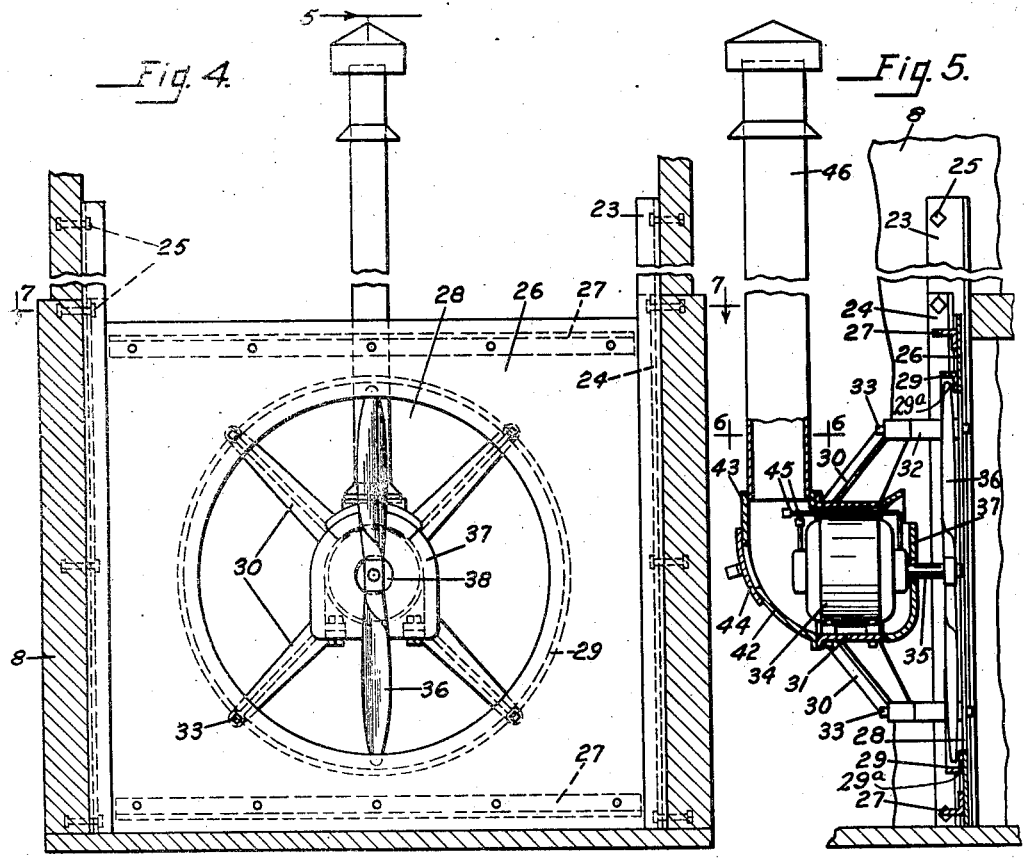
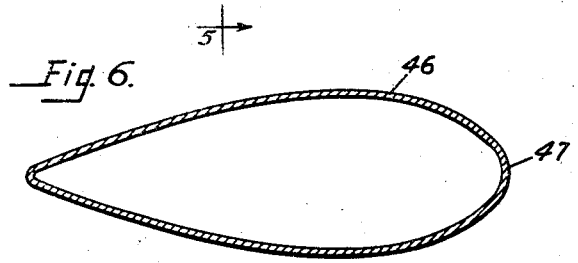
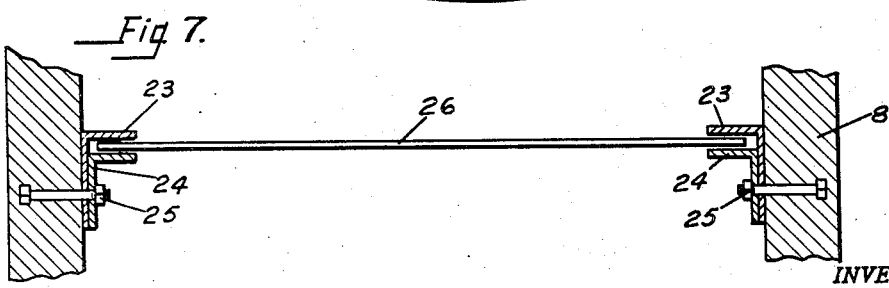
INVENTOR
WILLIAM H. SACHS.
RUSSELL T. VORIS.
BY Toulmin & Toulmin
ATTORNEY

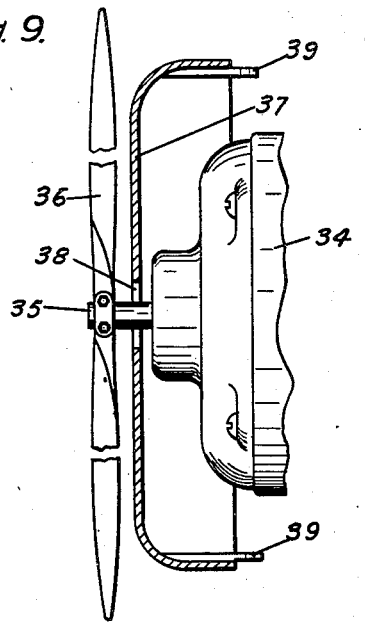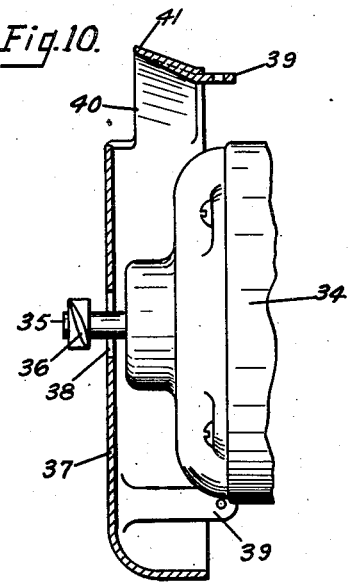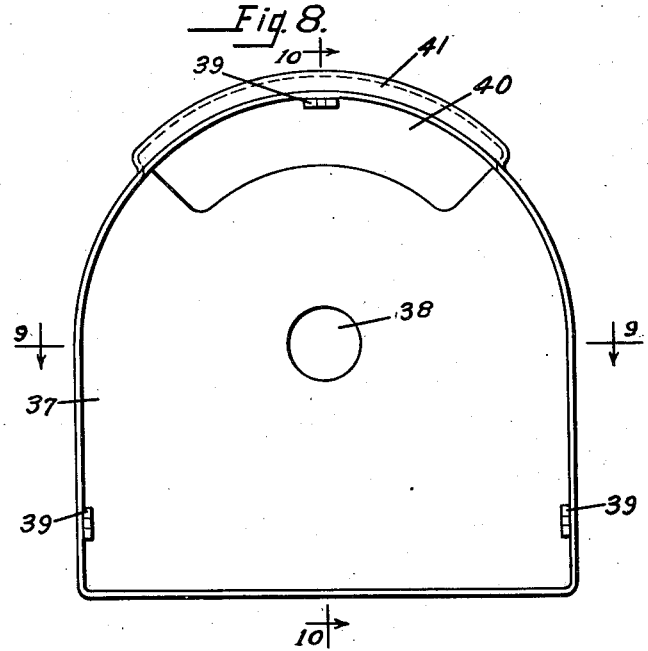

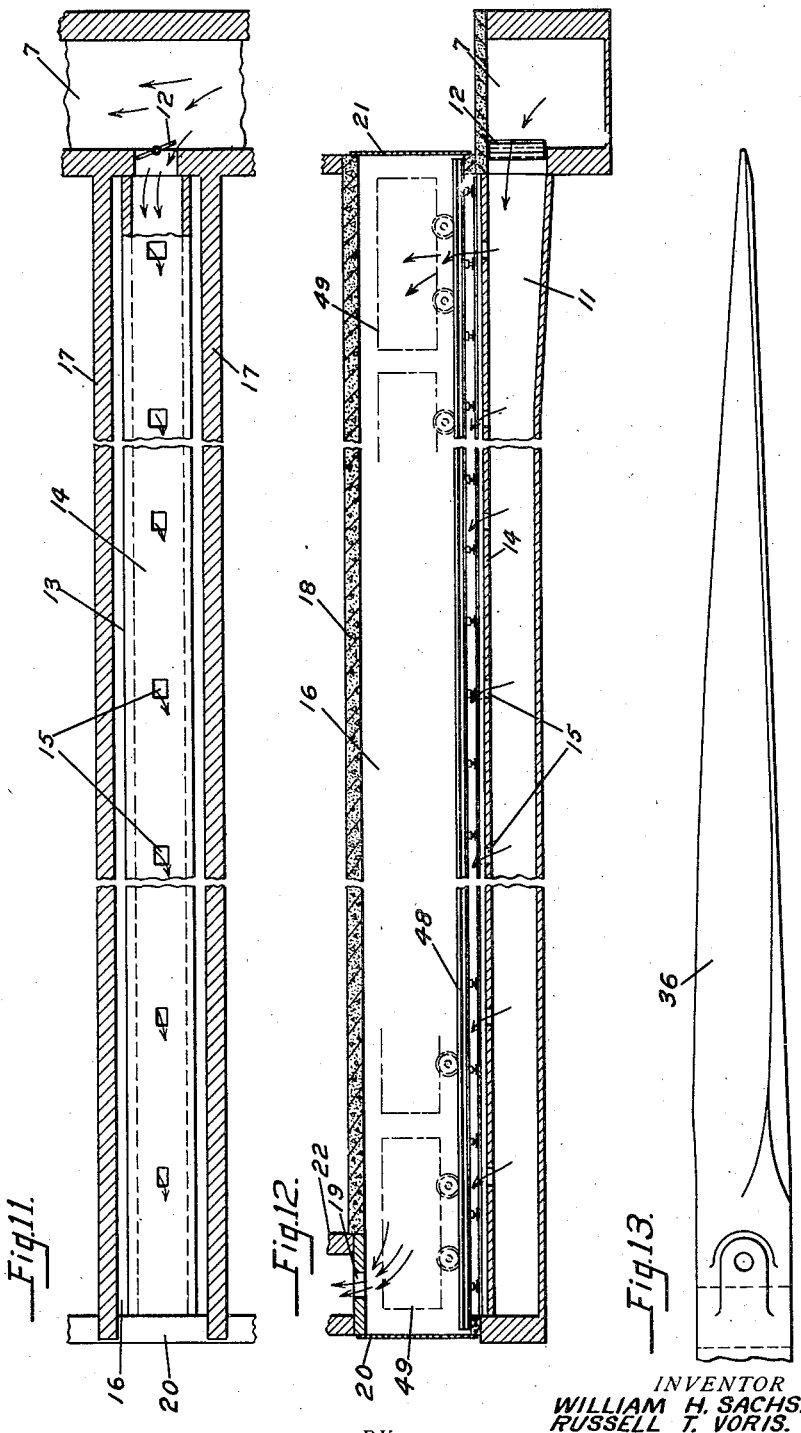

Patented May 30, 1933

1,911,533

UNITED STATES PATENT OFFICE

WILLIAM H. SACHS AND RUSSELL T. VORIS, OF DAYTON, OHIO, ASSIGNORS TO THE MANUFACTURERS EQUIPMENT COMPANY, OF DAYTON, OHIO, A CORPORATION OF OHIO

APPARATUS FOR DRYING CLAY AND OTHER CERAMIC MATERIALS

Application filed March 13, 1931. Serial No. 522,270.

This invention relates to improvements in apparatus for and the method of gathering otherwise wasted heat in the form of hot gases from ceramic kilns and conveying the heat and distributing it into drying ovens or tunnels. It is the object of this invention to provide means for conveying hot gases from kilns and distributing the gases to ovens for the purpose of drying clay and other plastic products, and other materials subject to drying processes.

It is particularly the object of this invention to provide flues or passageways from the kilns to the drying ovens or tunnels and place in the flues or passageways means for drawing air from the kilns and forcing it into the ovens or tunnels.

It is also the object of this invention to provide in connection with the flues or passageways, dampers or gates for regulating the amount of heated gases admitted to the ovens or tunnels.

It is also an object of this invention to provide a motor-operated means in said passageways for forcing the heated gases from the kilns to the ovens or tunnels and to provide in connection with the motor operating the gas-propelling means, means to prevent the motors becoming overheated by the hot gases. This heat-preventing means consists of a stream-lined pipe leading transverse the line of flow of the gases to a casing which surrounds the motor for conducting cool air to the motor. The heat-preventing means also consists of a deflector cooperating with the motor casing for deflecting and directing the cool air to all parts of the motor.

It is also an object of this invention to provide a motor casing the discharge end portion or cap of which is carried upward, to the rear of the motor and beyond the point where the motor shaft passes through it to form a protecting shield for the motor from the hot gases which rebound from the fan or hot air forcing device which is driven by the motor and located at the rear thereof; said shield terminating in a relatively small discharge opening for the cool air which is directed thereby into the suction zone of the motor operated fan.

It is also an object of this invention to provide in connection with drying ovens or tunnels, means for distributing heated gases to the ovens or tunnels unequally from one end thereof to the other.

It is also an object of this invention to provide in connection with an air-cooled motor for forcing hot gases from kilns to drying ovens, a motor-operated fan the blades of which are formed in the nature of airplane blades and which are aerofoil in cross section.

It is also an object of this invention to provide a method of applying hot gases to articles to be dried in which the articles pass through the gases from a less dense portion to a more dense portion of the gases.

These and other advantages will appear from the following description taken in connection with the drawings, in which a preferred embodiment of this invention is shown:

Figure 2 is a vertical section on the line 2—2 of Figure 1.

Figure 3 is a vertical section on line 3—3 of Figure 1.

Figure 4 is a vertical section on line 4—4 of Figure 1.

Figure 5 is a vertical section on line 5—5 of Figure 4.

Figure 6 is a horizontal section on line 6—6 of Figure 5.

Figure 7 is a horizontal section on line 7—7 of Figure 4.

Figure 8 is an inside elevation of the deflector cap.

Figure 9 is a horizontal section on line 9—9 of Figure 8.

Figure 10 is a vertical section on line 10—10 of Figure 8.

Figure 11 is a horizontal section through one of the heating tunnels or ovens.

Figure 12 is a vertical section through one of the drying tunnels and the drying flue beneath it.

Figure 13 is a front-edge view of one of the fan blades.

Figure 1:
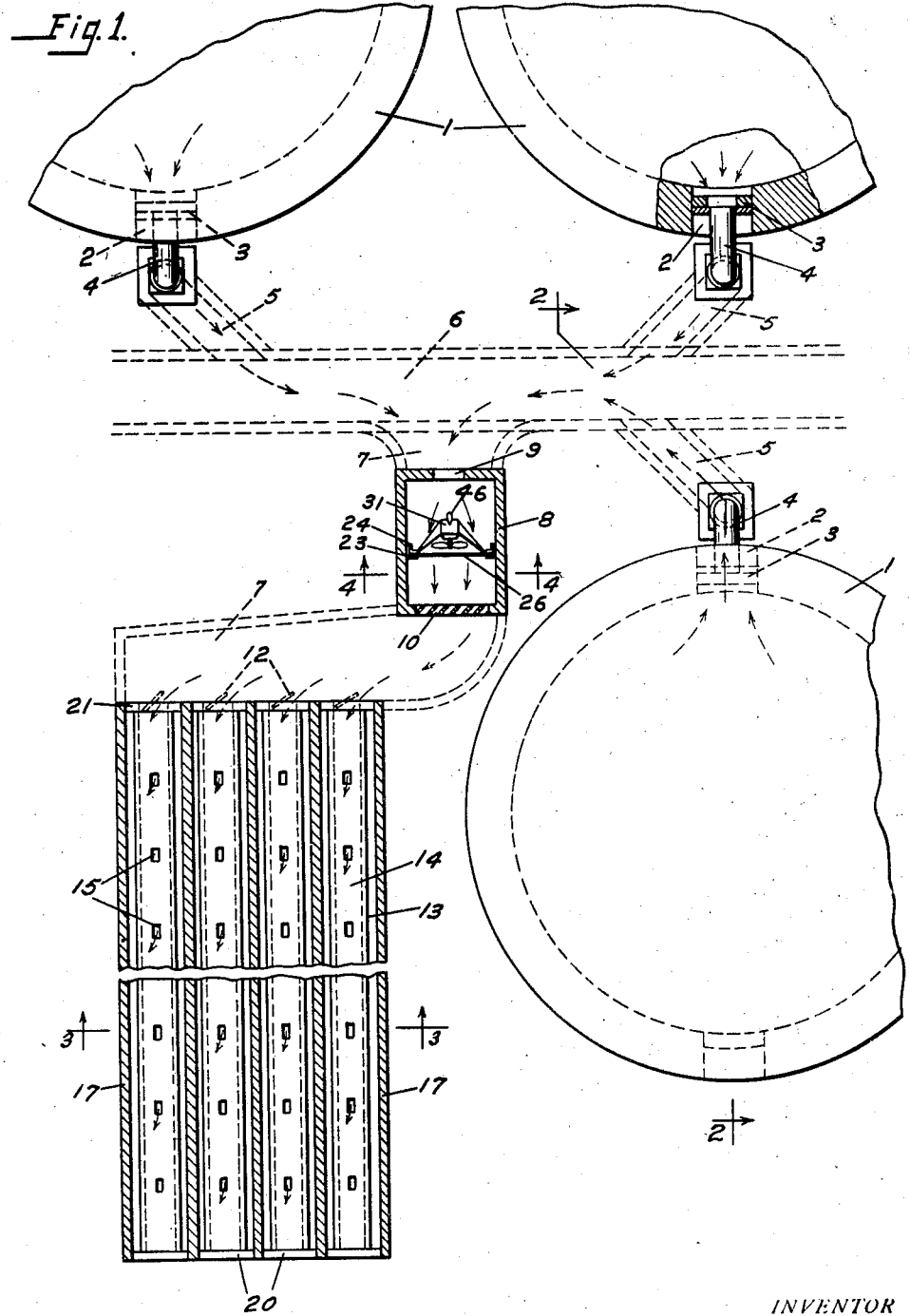
Figure 1 is a diagrammatic plan view of applicant's waste heat drying system.

In Figure 1, there is shown a diagrammatic plan or arrangement of the kilns, the flues leading from the kilns to the drying ovens or tunnels and a horizontal section of a bank of ovens or tunnels. The reference numeral 1 is used to designate kilns in which certain wares are heat-treated and from which hot gasses pass off. For the purpose of arranging and placing the articles to be treated in the oven, doorways 2 are provided. These doorways are closed when the kilns are full of articles to be heat-treated in any suitable manner. The closure for each doorway shown is indicated by the numeral 3, and has located in the upper end thereof a pipe 4 which extends from upper end of the doorway in horizontal direction and bends vertically downward and connects to a duct or branch flue 5. The branch flues lead into a main or distributing flue 6 which has other branches leading therefrom indicated by the numeral 7. These branches 7 extend to drying ovens or tunnels or banks of drying ovens or tunnels. In each branch flue 7 is a fan-housing 8, which has an inlet and an outlet below the ground, not shown. Numeral 9 is an inspection door above ground, and 10 is a louver damper also above ground, for tempering the hot gases. Each flue 7 has attached thereto one or more heat flues 11 or banks of such flues. At the point where the hot gases enter each heat flue, is a damper or gate 12, pivoted to swing on a vertical axis. These dampers or gates control the entrance spaces from the branch flue 7 into heat flues, and regulate the amount of hot gases entering the drying flues.

Each heat flue has side walls 13 and a top 14. In the top is a series of holes 15. These holes progressively increase in size from one end of each heat flue to the other. Connected to each heat flue is a drying tunnel or oven 16, which surrounds and envelopes the heat flue. The holes 15 lead from heat flue into this tunnel for conducting hot gases thereto. The walls of each tunnel are indicated by the numeral 17 and have supported thereon a top 18. This top is sufficiently high above the top of the heat flues that trucks with plastic or other products thereon may travel through the tunnel from one end thereof to the other above the heat flues. Each tunnel or oven has at its truck inlet end an outlet 19 entering into a stack 22. Each tunnel has a truck inlet 20 and a truck outlet 21 for the transportation of plastic or other products through the tunnel for drying purposes. For the purpose of drawing hot gases from the kilns and forcing them to the drying ovens, there is provided in flue 7 propelling means.

In order to support this propelling means, there is attached to each opposite side wall of the fan-housing a pair of angle irons to provide slots. One angle iron 23 of each pair is long and extends about twice as high as the other or shorter one 24. These angle irons are bolted to each other and to the walls of the fan-housing by means of bolts 25. These two angle irons, the short one and the long one, form a slot. There are, therefore, two of these slots, one on each side of the fan casing. In these slots is a plate 26 for supporting the gas-propelling means. This plate has across its top and lower edges reinforcing ribs 27. These ribs in the present instance, are shown to be of angle irons, but may be of any other suitable form or shape. This plate is rectangular in shape and has in the center thereof a round hole or opening 28, through which the hot gases are forced. Around this hole or opening 28 is a fan ring 29, to which is attached one end of arms 30. On one edge of the ring is a radially inwardly extending flange 29a by which the ring is attached to the plate. The arms extend from the fan ring toward each other and away from the center of the hole 28 and are attached to a cylindrical outer casing 31, which is adapted to contain and house a motor for operating a fan.

The casing 31 is cylindrical in form and open at both ends. Between the end of the arms and the fan ring are spacer sleeves 32. The arms and the spacer sleeves are held to the fan ring by means of bolts 33. A motor 34 is supported within the casing 31 and has extending therefrom a shaft 35 which has on the outer end thereof a fan element 36, the tips of which are behind the flange 29a so that recirculation of the air is prevented. This fan element may be composed of any number of blades. In the present instance there is only one blade unit.

On the end of the cylindrical casing adjacent the fan element there is a deflector cap 37 which has a hole 38 therein, through which the motor shaft 35 extends. This cap has lugs 39, by which it is attached to the fan casing. The upper edge of this deflector cap has an opening 40 for the exit of the air that passes around the motor through the motor casing. This opening is at the upper edge of the cap above the motor shaft so that all air entering into the motor casing must pass around the motor and its bearings before it can pass out through the opening 40 for the exit of the air from the motor casing. In order to facilitate the movement of the cooling air from the motor casing and to direct the air somewhat outwardly so as to be in the suction zone of the fan, the upper wall of the deflector cap above the exit opening 40 is bent up as indicated by the numeral 41. The deflector cap 37, which constitutes a continuation of the outer motor casing, as will be seen, extends upwardly beyond the hole 38 for the motor shaft a substantial distance, thereby forming a shield to protect the motor against the destructive influence of the hot gases which rebound from the suction fan, the discharge opening 40 being located substantially at the upper edge of the peripheral portion of the casing and due to its relatively small size and location effecting the discharge of the cool air in a stream of relatively high velocity. The bent or flared portion 41 directs this stream outwardly towards the periphery of the fan and hence in a direction towards the zone of greatest suction of the fan, the maximum of this of course being at the periphery of the fan. This is an important feature of my invention. On the other end of the motor casing is an intake cap 42, which has an intake opening therein. This cap is in the form of an elbow and terminates in the inlet opening 43, which is substantially vertical. In this intake cap is a door 44 for greasing the motor bearings. The motor has grease cups 45 which are reached through this opening.

Extending upwardly from the intake cap and supported thereon is a cold-air inlet pipe 46, which is streamlined as indicated by the numeral 47. This inlet pipe extends transverse the line of movement or flow of the gases being drawn from the kilns and forced to the ovens or tunnels. The purpose of having this pipe stream-lined is to offer the least possible resistance to the flow of the gases. The purpose of this pipe which extends out of the fan-housing into the open air, is to take in cool air and conduct the cool air around the motor so that the motor will not be overheated due to the hot air passing through the flue and fan-housing. This air is directed by the intake cap against one end of the motor from which it passes to all parts of the motor and out at the exit opening 40 in the deflector cap into the current of hot gases. By this means the cool air is forced to pass about all parts of the motor. In each drying tunnel or oven is a trackway 48 supported above the top of the heat flue, on which trucks 49 loaded with clay products and other products of plastic and other materials pass for drying purposes.

By means of the long and short angle irons used for forming the guides for the plate 26, the fan housing may be easily removed from the fan-housing, and in placing the fan unit back into position in the housing, the plate 26 is brought to bear against the long angle irons 23 above the short angle irons 24; with the plate in this position, the whole fan unit is permitted to be lowered with the ends of the plates sliding between the two angle irons on each side of the housing. When the fan unit has been lowered into the housing, it assumes the position shown in Figure 4 and in this position is used for operating purposes.

The holes 15 progressively increase in size as shown in Figure 11 from the truck inlet end of the drying tunnel to the truck outlet end, or in other words, these holes decrease in size from the entrance end of the flue 11 to the other end thereof. The area of all the holes 15 in the top of any heating flue is equal to the area of the inlet from the flue 7 to the flue 11 when the damper is wide open. The outlet 19 from each drying tunnel to its stack must not be less than 60 inches for brick and not less than 30 inches for tile, and in both cases this opening must not be more than 100 inches. This outlet may be restricted in any manner.

By regulating the outlets 19 and the inlets and the dampers or gates 12, the accumulation of hot gases in the drying tunnels may be controlled. By closing the dampers or gates 12, hot gases are prevented from too freely entering into the heat flues. By enlarging the outlets 19, the gases in the tunnels more readily escape. The rapidity with which the gases escape from the drying tunnels depends upon the height of the stacks, which is usually about 40 to 50 feet.

In operating the present apparatus all dampers and valves are regulated according to the needs and the fan is started to operate. The hot gases are drawn from the kilns and forced through the various passageways and flues into the drying flues, from which the hot gases pass into the drying tunnels. When the gases are being thus forced from the kilns into the drying tunnels, trucks, as shown in Figure 12, are moved along the track from the inlet entrance of the tunnel toward the outlet entrance.

Due to the variations in the sizes of the holes leading from the drying flues to the drying tunnels, a greater amount of hot gas is found in the outlet end of each drying tunnel than there is at the inlet end. In other words, the gas at one end of each drying tunnel is more dense than at the other end. By this means, the raw materials are first acted upon by gases less dense and therefore the drying action takes place less rapidly.

As the trucks pass from the inlet end to the outlet end of each tunnel, the material to be dried is acted upon by a denser hot gas and therefore dries more rapidly as it approaches the outlet end of the tunnel. The hole at the outlet end of the drying tunnel is about twice as large as the hole at the inlet end of the drying tunnel. It is therefore clear that gases much more rapidly pass into the drying tunnel at the outlet end thereof than at the entrance end.

In the present apparatus there is shown an efficient means for forcing hot gases from kilns into drying ovens, and at the same time regulating and controlling the application of the hot gases for drying purposes. There is also disclosed herewith a method for conducting hot gases from the source to drying ovens or tunnels for drying purposes. This method consists in extracting or drawing the hot gases from kilns and distributing it to drying ovens in such a manner that it is unevenly distributed throughout each drying oven.

There is also disclosed here the process of drying the raw products of plastic material by first subjecting the raw material to hot gases of one density and gradually thereafter subjecting the products to gases of greater density. There is also disclosed here the method or process of conducting hot gases from kilns by mechanical means and distributing these gases to drying ovens and at the same time by said mechanical means drawing cool air for the purpose of cooling the mechanical means and delivering the cool air into the body of the hot gases.

We desire to comprehend within our invention such modifications as may be clearly embraced within our claims and the scope of our invention.

Having thus fully described our invention, what we claim as new and desire to secure by Letters Patent, is:

1. In an exhauster, in combination with a source of hot gases and an outlet therefrom, a motor in said outlet, an exhaust fan on the shaft of said motor for drawing gases from said source, a casing for said motor having caps at the intake and discharge ends, said intake cap being in the form of an elbow and providing a space at the rear of the motor to establish free communication with the entire end of said motor, the discharge and cap of the motor extending upwardly a substantial distance beyond the axis of the motor and terminating in a small, arcuate discharge opening, flared at the upper edge of said opening for directing the cool air outwardly and upwardly from said casing, and a cool-air pipe connected with said intake cap and extending upwardly therefrom transverse to the line of flow of hot gases, said pipe being of sufficient capacity to admit a maximum quantity of cool air through said intake cap to the entire area of the rear end of the motor.

2. In an exhauster, in combination with a source of hot gases and an outlet therefrom, a motor in said outlet and an exhaust fan on the shaft of said motor for drawing gases from said source, a casing for said motor, a casing cap at the inlet side of said motor, and a cool-air pipe extending through the outlet for the hot gases and connected with said cap, said casing at the exit side of the motor being extended upwardly a substantial distance to form a shield against the rebound of gases and terminating in a relatively small discharge opening of arcuate form constructed to direct the discharge of the cooling air into the suction zone of the fan, and perforated to receive the shaft of said motor.

3. The combination with a source of hot gases and an outlet conduit therefrom, a motor in said conduit, an exhaust fan on the shaft of said motor for drawing gases from said source, a casing for said motor having caps at the intake and discharge ends, a cool-air pipe connected with said intake cap and extending upwardly therefrom transverse to the line of flow of hot gases through said conduit, the cap at the discharge end of the casing being provided with a perforation for the motor shaft and extending upwardly a substantial distance beyond said perforation to a point adjacent the periphery of the motor casing and terminating in a relatively small discharge opening, said cap at the upper terminal of said opening being flared outwardly to direct the relatively small stream of cool air discharged from said motor casing outwardly towards the zone of greatest suction of said fan.

In testimony whereof, we affix our signatures.

WILLIAM H. SACHS.
RUSSELL T. VORIS.